United States Patent [19]

Mikelsons

[11] 4,054,467
[45] Oct. 18, 1977

[54] METHOD OF COATING ALUMINUM SUBSTRATES

[75] Inventor: Valdis Mikelsons, Mendota Heights, Minn.

[73] Assignee: Minnesota Mining and Manufacturing Company, St. Paul, Minn.

[21] Appl. No.: 692,038

[22] Filed: June 2, 1976

Related U.S. Application Data

[62] Division of Ser. No. 538,928, Jan. 6, 1975, Pat. No. 3,975,197.

[51] Int. Cl.$^2$ .............................................. C23F 7/22
[52] U.S. Cl. ................................... 148/6.3; 148/6.27; 427/180; 427/203; 427/204
[58] Field of Search ............... 427/180, 203, 204, 205; 148/6.27, 6.3; 204/38 A, 35 N

[56] References Cited

U.S. PATENT DOCUMENTS

| 3,664,888 | 5/1972 | Oga et al. | 148/6.27 |
| 3,871,881 | 3/1975 | Mikelsons | 148/6.27 X |

Primary Examiner—Ralph S. Kendall
Attorney, Agent, or Firm—Cruzan Alexander; Donald M. Sell; Dean P. Edmundson

[57] ABSTRACT

Aluminum substrates are provided having a coating of particulate material bound thereto by means of an in situ formed binder of aluminum hydroxyoxide. The coated aluminum constructions have utility in imaging and reproduction processes (e.g., as printing plates, as electrographic elements, etc.), as magnetic recording surfaces, controlled roughness surfaces, decorative panels, protective surfaces, etc.

9 Claims, 2 Drawing Figures

METHOD OF COATING ALUMINUM SUBSTRATES

This is a division of application Ser. No. 538,928, filed Jan. 6, 1975, now U.S. Pat. No. 3,975,197.

This invention relates to coated aluminum substrates and, more particularly, to coated aluminum substrates having utility in various imaging and reproduction processes, e.g., as lithographic plates and electrographic elements. The invention also relates to coated aluminum substrates having utility as magnetic recording surfaces, controlled roughness surfaces, decorative panels, etc.

Coated aluminum substrates have many applications. Thus, for example, photosensitive coatings on aluminum have been used in the preparation of printing plates, and ferro-magnetic coatings on aluminum have been used in the preparation of magnetic discs for use in rapid access information storage.

Such coated structures are generally obtained by bonding the desired particulate material to the aluminum substrate by means of an organic binder. That is, the use of a conventional binder has heretofore been believed necessary in order to obtain the bonding or adhesion of the desired particulate material to the aluminum substrate.

Although the use of such conventional binders may be acceptable for some types of coated aluminum products, there are several disadvantages which are inherent in the use of conventional binders for this purpose. For example, it is very difficult to prepare electrographic elements which are hard, scratch-resistant and resistant to pressure marking when using conventional binders. It is also rather difficult, if not impossible, to prepare abrasion-resistant hydrophilic substrates for lithographic plate applications when using conventional organic binders because most of such binders are hydrophobic in nature. Those hydrophilic binders which are known are not ordinarily useful for making lithographic printing plates because such binders are subject to attack by the printing solutions during use. Furthermore, such binders lack high temperature resistance and are susceptible to degradation by ozone and ultraviolet light.

Other disadvantages attendant with the use of an organic binder to bond coatings to aluminum revolve around the necessity for removing the oxide film from the aluminum substrate so that the organic binder will firmly anchor thereto. It is common knowledge that an aluminum oxide film forms on the surface of aluminum during exposure to air and moisture, and conventional binders generally anchor very poorly to this naturally occurring oxide flm. Accordingly, it is necessary to remove this oxide film before the desired coating can be applied to the aluminum substrate. Various treatments to remove this oxide film are disclosed in a number of patents, e.g., U.S. Pat. Nos. 2,137,988; 2,244,526; 2,868,679; 2,945,778; 3,231,425; and 3,544,391. Generally, these treatments to remove the oxide film involve the immersion of the aluminum substrate into baths containing various acids.

Such techniques for the removal of the aluminum oxide film also have several disadvantages attendant therewith. For example, the procedures require considerable processing time, and one must use highly acidic materials and special cleaning baths, etc. Among other disadvantages, the use of acidic cleaning baths gives rise to water pollution problems.

Consequently, the use of conventional binders for anchoring various types of coatings or particulate material to aluminum substrates is unsatisfactory in many respects. Although such techniques produce adequate coated structures for some uses, these techniques are not generally useful for the preparation of highly abrasion-resistant lithographic printing plates, electrographic elements, high density magnetic recording surfaces, etc.

SUMMARY OF THE INVENTION

In accordance with the present invention, there is provided an article comprising an aluminum substrate and a coating of particulate material overlying the substrate, the particulate material being bound to the substrate by an in situ formed binder of aluminum hydroxyoxide. Depending upon the type of particulate material bound to the aluminum, the articles of the invention have utility as electrographic elements, lithographic printing plates, controlled roughness surfaces, magnetic recording discs, decorative panels, protective surfaces, etc.

The invention also provides a process for making the novel articles, the process comprising:

1. applying particulate material to an aluminum substrate, 2. exposing the aluminum substrate bearing the particulate material to an oxidizing environment containing water for a time, in an amount, and at a temperature sufficient to provide in situ formation of alumium hydroxyoxide whereby the particulate material is firmly bound to the aluminum substrate.

Following the teachings of the present invention, the problem associated with the use of conventional binders to anchor coatings to aluminum substrates are avoided. Thus, since the naturally occurring aluminum oxide film need not be removed from the surface of the aluminum substrate, the problems attendant with acid baths and time-consuming processing techniques are avoided. Also, it is not necessary to select an appropriate organic binder for a particular coating since the organic binder may not be used at all. Furthermore, the articles of the invention can be provided with high density packing of particles on the substrate. Moreover, since the in situ formed binder of aluminum hydroxyoxide firmly anchors the particles to the aluminum substrate, the invention provides hard, scratch-resistant electrographic elements and lithographic plate substrates.

DETAILED DESCRIPTION OF THE INVENTION

The invention will be described in more detail hereinafter with reference to the accompanying drawings wherein like reference characters refer to the same parts throughout the several views and in which.

Figure 1:
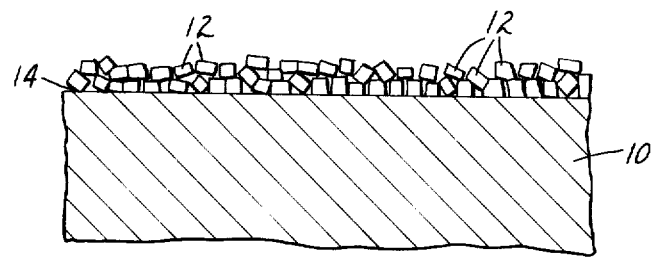
FIG. 1 is a cross-sectional view of an aluminum substrate having a layer of unbonded particulate material disposed thereon.
Figure 2:
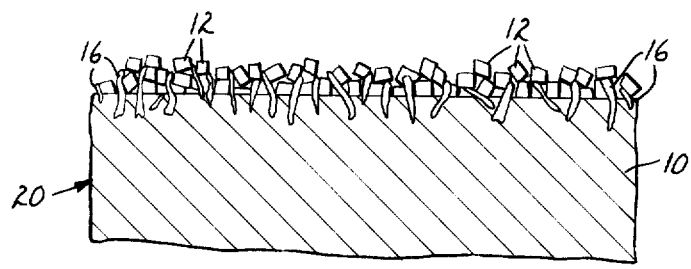
FIG. 2 is a cross-sectional view of an aluminum substrate having particulate material bound thereto by an in situ formed binder of aluminum hydroxyoxide.

In FIG. 1 there is shown an aluminum substrate 10 having water-insoluble particles 12 disposed on the surface 14 of the substrate. In FIG. 2 there is shown a coated aluminum article 20 comprising the aluminum substrate 10 having particulate material 12 bonded to the surface of the aluminum substrate by means of in situ formed aluminum hydroxyoxide 16. The aluminum hydroxyoxide is formed by exposing the particulate-coated aluminum surface to an oxidizing environment containing water, whereby the surface of the aluminum substrate is oxidized to form hydrated aluminum oxide which grows as crystallites around the particulate material to form a matrix firmly bonding the particulate material to the surface of the aluminum substrate.

Aluminum substrates which are useful in the practice of the present invention include pure aluminum as well as other aluminum products containing up to about 30% or more of alloying metals. For example, useful aluminum alloys include "Lynite", a commercially available alloy of aluminum containing 5% by weight of copper; "Aluminum-silicon 43", a commercially available aluminum alloy containing about 5% silicon; "Aluminum Alloy 35", a commercially available aluminum alloy containing 1.25% manganese; "Aluminum Alloy 3003", a commercially available alloy containing about 98% aluminum; "Aluminum Alloy 1100", a commercially available alloy containing about 99.2% aluminum; and "Aluminum Alloy 1145", a commercially available alloy containing about 99.55% aluminum.

In addition to pure aluminum and aluminum alloys, the term "aluminum substrate" as used herein also includes any substrate which has been overcoated or clad with pure aluminum or an alloy of aluminum. For example, the term "aluminum substrate" as used herein includes plastic films which have thin vapor coatings of aluminum or aluminum alloy thereon. In essence, the term "aluminum substrate" includes any material having sufficient surface-occurring aluminum to support the growth of aluminum hydroxyoxide in an oxidizing environment.

Particulate materials which may be bonded to aluminum substrates in accordance with the present invention include solid materials having a melting point above about 150° C. and having a water solubility of less than about 0.1 parts per 100 parts of water at 100° C. The particles may be of any shape, e.g., cube, needles, irregular, fiber, etc., and they have an average size of about 0.05 to about 3,000 microns, although it is preferred for the particles to have an average size of about 0.05 to about 5 microns. Depending upon the desired properties of the coated aluminum substrate, the particles can be soft or hard, organic or inorganic, conductive or nonconductive, photosensitive or nonphotosensitive, etc. Mixtures of various particulate materials may also be used.

Although not necessary for the practice of the present invention, it is preferable to use particulate material which is water-wettable. That is, when water (surface tension of 72.8 dynes/cm.) is placed in contact with the surface of the preferred particulate material, the water spreads across the surface thereof to form a film. Particulate material which is not water-wettable according to this criteria can also be bonded in accordance with the present invention (e.g., by mechanically holding the particulate material against the aluminum substrate during the oxidation step).

Representative of the various particulate materials which may be used in the practice of the present invention include:

| PARTICULATE MATERIAL | M.P. ° C. | PARTICULATE MATERIAL | M.P. ° C. |
| --- | --- | --- | --- |
| Titanium dioxide | 1640 | Sodium bismuthate | — |
| Zinc oxide | >1800 | Calcium carbonate | 825 (de- composes) |
| Indium oxide | 850 (decomposes) | Cadmium sulfide | 1750 |
| Silica | <1470 | Barium oxide | 1923 |
| Barium titanate | — | Lead sulfide | 1114 |
| Magnesium oxide | 2500 | Ferrous sulfide | 1193 |
| Chromic oxide | 1990 | Cotton fibers | — |
| Zirconium oxide | 2950 | Cerium oxide | 1950 |
| Zinc sulfide | 1850 | Vanadium dioxide | 1967 |
| Lithium titanate | — | Zinc rosinate | 165–168 |
| Manganese dioxide | 535 (decomposes) | gamma-Ferric oxide | 1565 |
| Calcium oxide | 2573 | Beryllium oxide | 2570 |
| Yttrium oxide | 2410 | Asbestos | — |
| Aluminum oxide | 2050 | Clay, e.g., Bentonite | — |
| Calcium fluoride | 1360 | Powdered metal, e.g., copper pigment | 1083 |
| Calcium tungstate | — | Nylon | >150 |
| Antimony oxide | 656 | Teflon | >150 |
| Bismuth trioxide | 820 | Copper phthalocyanine | 500 (sublimes) |
| 1,5-dichloroanthraquinone | 251 | Anthraquinone | 286 (sublimes) |

The foregoing list of particulate material is merely representative of the types of materials which may be used in the present invention. It will be apparent to one skilled in the art that other particulate materials possessing suitable melting points and water-insolubility may also be bonded to aluminum substrates as taught herein.

In preparing the coated product of the invention, the aluminum substrate is ordinarily cleaned of oil and surface impurities by any of the conventional processes heretofore used for cleaning aluminum. Although it is not necessary to remove the naturally occurring aluminum oxide film from the surface of the substrate, this may be done if desired. Ordinarily, however, the aluminum substrate is simply cleaned by washing it with an aqueous solution of a conventional surfactant or detergent, followed by rinsing with water and drying. Organic solvents may be used to remove oils from the aluminum.

The particulate material to be bonded to an aluminum substrate is ordinarily deposited or disposed on the aluminum surface in a thin layer. In one sense the particulate material may be simply dusted onto the surface of the aluminum substrate followed by exposing the coated substrate to an oxidizing atmosphere. However, it has been found that increased bonding efficiency is obtained when the particulate material is applied to the aluminum substrate from a dispersion thereof in a liquid vehicle, followed by evaporation of most or all of the liquid vehicle. It is believed that when applying the particulate material from a liquid vehicle, the particulate material becomes more firmly packed on the aluminum substrate and thus establishes better physical contact therewith.

Suitable liquid vehicles which have been used for this purpose include water, lower aliphatic alcohols, (e.g., methanol, ethanol, isopropanol, n-propanol, n-butanol, and isobutanol) lower aliphatic ketones (e.g., acetone and methyl ethyl ketone), aliphatic hydrocarbons having about 6–12 carbon atoms (e.g., hexane and octane), aromatic hydrocarbons having about 6–8 carbon atoms (e.g., benzene, toluene, and xylene), and miscible blends of these vehicles. Preferred vehicles include the lower aliphatic alcohols which thoroughly wet the aluminum substrate and the particulate material and provide for less agglomeration of the particulate material on the substrate. Generally, the vehicle is a nonsolvent for the particulate material, although it may be a solvent therefor so long as the material crystallizes or otherwise forms discrete particles in a discontinuous manner when the vehicle is removed.

After the desired particulate material has been deposited or disposed on the surface of the aluminum substrate, the so-coated substrate (which is preferably, but not necessarily, dry) is exposed to water in an oxidizing environment. Although this can be done by simply immersing the coated substrate in liquid water for a period of time, it is more preferable to expose the coated substrate to a gaseous oxidizing environment that is essentially saturated with water vapor at 20°–150° C. For example, the aluminum substrate with particulate material disposed thereon may be introduced into an environment of steam. The effect of the water and the oxidizing atmosphere is to cause the in situ formation of an aluminum hydroxyoxide crystalline layer which grows on the surface of the aluminum substrate and forms a matrix about the particulate material, thereby firmly bonding the particulate material to the aluminum substrate.

The efficiency of the just described process for the bonding of particulate material to the aluminum substrate is believed to be due to one or both of two factors, one being chemical in nature and the other physical in nature. It is postulated that the chemical factor for bonding of the particulate material to the aluminum is a result of coordination between the aluminum atoms and atoms in the particulate material which have a coordinating capability. For example, the titanium in titanium dioxide and the zinc in zinc oxide have coordination sites enabling a coordination to aluminum atoms through an oxygen atom.

The physical factor for the bonding of particulate material to the aluminum substrate is the result of the growth of pseudoboehmite crystallites about the particulate material to thereby mechanically bind it to the aluminum substrate. The formation of pseudoboehmite, a metastable aluminum hydroxyoxide, by the reaction of aluminum or aluminum oxide with liquid water in air is discussed by Vedder and Vermiyea, Trans. Faraday Soc. 65, 561–584 (1969) and Alwitt, J. Electrochemical Soc. 118 (11), 1730 (1971). The pseudoboehmite can be identified in the bonded coatings of the invention by electron microscopy which shows that the crystals which form the matrix around the deposited particulate material have the characteristic lamellar shape.

In the practice of the invention the aluminum substrate having particulate material disposed thereon, is exposed to an oxidizing atmosphere containing water for a time, in an amount, and at a temperature sufficient to provide in situ formation of aluminum hydroxyoxide to firmly bond the particulate material to the substrate. The exposure time required for the process depends upon the temperature of the oxidizing environment, the mass of the aluminum substrate, and the amount of particulate material disposed on the aluminum substrate. Generally, it has been found that the maximum amount of particulate material which can be practically bonded to an aluminum substrate is about 0.0004 grams per square centimeter.

By increasing the mass of the aluminum substrate, or by increasing the amount of particulate material disposed on the substrate, the exposure time required to obtain the requisite formation of sufficient aluminum hydroxyoxide also increases. The requisite exposure time may be shortened by increasing the temperature of the oxidizing environment. The efficiency of the bonding process also increases with decreasing amounts of deposited particulate material.

As an example, $TiO_2$ particles (0.05 microns) disposed on a 5 mil (127 micron) thick aluminum sheet in an amount of $1 \times 10^{-4}$ grams/sq. cm. were firmly bonded thereto in 30–45 seconds when exposing the sample to 100° C. steam at atmospheric pressure. Similar particulate material was firmly bonded to a 62.5 mil (1.6 mm.) aluminum sheet under the same conditions in about 3 minutes. Longer exposure times may, of course, be used if desired.

The oxidizing environment to which the particulate material coated aluminum substrate is exposed to obtain the in situ formation of aluminum hydroxyoxide may be a water bath, although preferably it is an atmosphee obtained by admitting steam into an open vessel. Closed vessels containing steam and air at pressures ranging from atmospheric to pressures of 100 psi or more may also be used. By regulation of the quantity and pressure of steam introduced into the vessel, temperatures from about 50° to about 150° C. suitable for causing the formation of the bonding aluminum hydroxyoxide crystallites may be obtained. The ratio of steam to air is not critical, a suitable range being between about 1:20 to 20:1 parts of air per part of steam.

An oxidizing gas (for example, oxygen) may be used to replace part or all of the air used in the oxidative atmospheres. Such oxygen-enriched atmospheres are particularly useful where the particulate material to be bonded to the aluminum substrate is prone to reduction during the bonding process as is, for example, particulate zinc oxide and indium oxide. It is also preferable to wet the particulate material with water (or with water containing a surfactant or wetting agent) prior to contacting the sample with steam or other oxidizing atmosphere.

The efficiency of the bonding process can be enhanced (particularly when bonding increasing amounts of particulate material) by the incorporation of various additives into the dispersion of the particulate materials on the aluminum substrate. Included among the additives that may be used, if desired, are alkali metal, alkaline earth metal (except beryllium), and rare earth metal oxides, hydroxides, carbonates, acetates, nitrates, and halides. Generally, the useful additives provide a pH of about 4.0 or higher to the dispersion of the particulate material in water.

Preferred additives include CaO, BaO, MgO, NaOH, $CH_3CO_2Na$, $Ba(NO_3)_2$, $Mg(NO_3)_2.6H_2O$, $Sr(NO_3)_2$, $Ca(NO_3)_2.4H_2O$, $CaF_2$, $CaCO_3$, $BaCO_3$, $NaHCO_3$, and $Ca(C_2H_3O_2)_2$. Generally these additives are used in an amount of about 0.01–1 part by weight per 1 part by weight of particulate material to be bonded.

The coated aluminum substrates prepared in accordance with this invention are tough, hard, and hydrophilic. They are therefore useful as base material for lithographic plates and as surface protective coverings such as wall coverings where their hydrophilic nature makes them nonsoiling and readily cleanable. Furthermore, the particulate material-bonded surfaces retain the properties that the particulate materials possess prior to bonding. Thus, for example, zinc oxide and titanium dioxide powders bonded to aluminum as taught herein are photoconductive and photocatalytic;

zinc (cadmium) sulfide particles bonded to aluminum surfaces as taught herein are photoluminescent; and gamma-ferric oxide powders bonded to aluminum surfaces as taught herein are magnetic. Consequently, the coated aluminum substrates of this invention are useful as recording elements including lithographic printing plates, photoluminescent devices, magnetic recording discs, electrophotographic elements, etc.

The present invention is further illustrated by means of the following examples wherein the term "parts" refers to parts by weight unless otherwise indicated.

EXAMPLE 1

A sheet of 32 gauge (8 mils, 203 microns) aluminum was cleaned by washing it with an aqueous solution containing 6% trisodium phosphate, rinsing with water, and drying. It was then coated with a dispersion of titanium dioxide using a No. 16 Meyer bar and allowed to dry for 5 minutes (longer periods of drying give similar results). The dispersion of titanium dioxide was prepared by ball milling for 17 hours a mixture of 10 grams titanium dioxide and 200 ml. of isopropyl alcohol. The titanium dioxide particles were cube shaped and about 0.05 micron in size. The amount of titanium dioxide applied to the aluminum sheet was about 0.00028 grams per square centimeter.

The coated aluminum sheet, from which the titanium dioxide could very easily be removed by gentle touch with the fingers, was wet with water and placed into an open vessel into which steam from a 25 psi steam line was introduced. The coated aluminum sheet was exposed to the steam (100° C.) for 15 minutes and then dried. A strongly adhering film of titanium dioxide resulted on the aluminum substrate. To test the anchorage of the film to the aluminum, a strip of pressure-sensitive adhesive tape was pressed against the coated surface of the substrate and then removed using a test procedure similar to that described in U.S. Pat. No. 3,554,836. On peeling the tape from the surface it was observed that the adhesive suffered cohesive failure rather than remove the bonded particulate material from the aluminum substrate. The 180° peel force for the 1.895 cm. wide pressure-sensitive tape used in the test was 1,600 grams (840 grams/cm.).

EXAMPLE 2

A sheet of 8 mil (203 microns) aluminum was cleaned as in Example 1. It was then coated with the dispersion of titanium dioxide from Example 1 using a No. 16 Meyer bar and allowed to dry for 5 minutes. The dry coating weight was the same as in Example 1. The coated aluminum sheet was then immersed in deionized water at 21° C. After 5 days some bonding of the titanium dioxide had occurred and after 21 days, a strongly adhering layer of titanium dioxide was formed on the surface of the aluminum sheet. The coating could not be removed by peeling a pressure-sensitive adhesive tape from the surface as described in Example 1.

EXAMPLES 3–32

Example 1 is repeated using in place of titanium dioxide the particulate materials listed in Table I. The time of steam treatment and the bonding results for each particulate material are also given in Table I. Each of the particulate-bonded aluminum surfaces obtained are tough, scratch-resistant, and hydrophilic. In general, the bonded surfaces are useful as substrates for printing plates and nonsoiling protective surfaces. The bonded particulate materials retain the properties they possess prior to bonding.

TABLE I

| Ex. No. | Particulate Material | Time of Steam Treatment -Min. | Bonding Results | Use[e] of the Bonded Surface |
|---|---|---|---|---|
| 3 | MgO | 19 | b | Protective layer |
| 4 | BeO | 15 | c | |
| 5 | CaO | 3 | c | |
| 6 | BaO | 5 | c | |
| 7 | ZrO$_2$ | 19 | a | |
| 8 | Y$_2$O$_3$ | 5 | b | |
| 9 | MnO$_2$ | 10 | c | |
| 10 | Al$_2$O$_3$ | 10 | c | |
| 11 | CaF$_2$ | 19 | b | |
| 12 | CaWO$_4$ | 10 | c | |
| 13 | Cr$_2$O$_3$ | 60 | c | |
| 14 | Sb$_2$O$_3$ | 5 | c | |
| 15 | Bi$_2$O$_3$ | 5 | d | |
| 16 | Li$_2$TiO$_3$ | 19 | d | |
| 17 | NaBiO$_3$ | 5 | c | |
| 18 | CaCO$_3$ | 8 | d | |
| 19 | Zn(Cd)S | 15 | c | Luminescent surface |
| 20 | CdS | 30 | c | Luminescent surface |
| 21 | PbS | 5 | d | |
| 22 | FeS | 5 | d | |
| 23 | Cu | 6 | b | Decorative surface |
| 24 | Zn Rosinate | 5 | c | |
| 25 | Cotton Fibers | 5 | c | Decorative surface |
| 26 | Asbestos Fibers | 10 | b | |
| 27 | Kaolinite | 5 | c | |
| 28 | CeO$_2$ | 5 | b | Photocatalytic |
| 29 | TiO$_2$ | 15 | a | Photoconductive, Photocatalytic |
| 30 | ZnO | 5 | b | Photoconductive, Photocatalytic |
| 31 | BiTiO$_3$ | 18 | b | Photoconductive, Photocatalytic |
| 32 | gamma-Fe$_2$O$_3$ | 19 | b | Magnetic surface | a = excellent,
b = good,
c = fair (coatings are thin but uniform),
d = poor (coatings are thin and nonuniform),
[e]in addition to use as a substrate for a printing plate, nonsoiling surface, and surface priming.

EXAMPLES 33–55

These examples illustrate that the efficiency of the bonding process may be improved by the presence of certain compounds.

Aqueous dispersions were prepared by ball milling a mixture of 1 part titanium dioxide and from about 0.03 to 1.0 parts of the various additives listed in Table II. The mixtures were then coated at three different coating weights onto 3 inch by 3 inch pieces of 3 mil (76 microns) aluminum foil, dried and weighed. The dried foil was placed into an open vessel and steam (100° C.) introduced therein. After contact with the live steam for 5 minutes, the coated foil was removed, washed in water, rinsed, dried and weighed. The coatings obtained were tough and scratch-resistant. Bonding efficiency was calculated as the percentage of coating remaining after the treatment. The results obtained for a number of additives at five different coating weights is presented in Table II. Values about 100% are possible because the weight gain due to the formation of the hydrated alumina binder matrix is included in the sample weight after the steam treatment.

TABLE II

| Ex. No. | Additive | Parts Additive per Part TiO$_2$ | pH of the Dispersion | BONDING EFFICIENCY (%) Coating Weight of Particulate Material Disposed on Substrate | | | | |
|---|---|---|---|---|---|---|---|---|
| | | | | $2.5 \times 10^{-4}$ g/cm$^2$ | $3.0 \times 10^{-4}$ g/cm$^2$ | $4.0 \times 10^{-4}$ g/cm$^2$ | $6.0 \times 10^{-4}$ g/cm$^2$ | $8 \times 10^{-4}$ g/cm$^2$ |
| 33 | None | — | 4.0 | 75 | 57 | 40 | 23 | 10 |
| 34 | CaO | 0.03 | 11.95 | 121 | 116 | 80 | | |
| 35 | BaO | 0.03 | 11.65 | 100 | 90 | 65 | | |
| 36 | MgO | 0.1 | 10.80 | 141 | 93 | 64 | 37 | |
| 37 | BeO | 0.03 | 9.41 | 56 | 43 | 34 | | |
| 38 | ZnO | 0.3 | 4.0 | 74 | 64 | 42 | | |
| 39 | NaOH | 0.03 | 10.45 | 132 | 128 | 116 | 82 | 49 |
| 40 | CH$_3$CO$_2$Na | 0.03 | 6.55 | 120 | 96 | 77 | 43 | 35 |
| 41 | NaCl | 0.03 | 5.20 | 73 | 56 | 35 | 21 | 18 |
| 42 | NaHSO$_4$ | 0.03 | 2.50 | 41 | 26 | 14 | 7 | 6 |
| 43 | Ba(NO$_3$)$_2$ | 0.16 | 3.84 | 102 | 89 | 69 | 46 | 31 |
| 44 | Mg(NO$_3$)$_2$ . 6H$_2$O | 0.16 | 4.73 | 120 | 118 | 98 | 53 | 38 |
| 45 | Sr(NO$_3$)$_2$ | 0.13 | 4.73 | 106 | 102 | 75 | 38 | 24 |
| 46 | Ca(NO$_3$)$_2$ . 4H$_2$O | 0.15 | 4.74 | 113 | 102 | 88 | 53 | 36 |
| 47 | CaF$_2$ | 1.0 | 6.26 | 107 | 109 | 93 | 60 | 42 |
| 48 | CaCl$_2$ | 0.03 | 3.82 | 64 | 51 | 39 | 25 | 15 |
| 49 | CaSO$_4$ | 0.03 | 4.13 | 65 | 57 | 36 | 19 | 13 |
| 50 | ca(C$_2$H$_3$O$_2$)$_2$ | 0.03 | 6.32 | 90 | 88 | 66 | 39 | 36 |
| 51 | CaO + NaOH | 0.03–0.03 | 12.0 | | | | | |
| 52 | CaCO$_3$ | 0.03 | 6.22 | 102 | 90 | 77 | 49 | 27 |
| 53 | BaCO$_3$ | 0.03 | 6.79 | 125 | 115 | 98 | | |
| 54 | NaHCO$_3$ | 0.03 | 8.64 | 120 | 115 | | 80 | |
| 55 | NH$_4$NO$_3$ | 0.03 | 4.42 | 74 | 65 | 49 | 25 | 14 |

The data of Table II shows that bonding efficiency is increased for additives magnesium oxide, sodium hydroxide, calcium oxide, calcium carbonate, barium carbonate, sodium bicarbonate, sodium acetate, magnesium nitrate, calcium nitrate, calcium fluoride, barium nitrate, and calcium acetate. Additives such as zinc oxide, calcium chloride, ammonium nitrate, and calcium sulfate have very little effect on the bonding efficiency. Beryllium oxide in addition to those additives (such as sodium bisulfate) which have a pH in water of less than 3.0 decrease the bonding efficiency. The data shown in Table II also illustrates that the bonding efficiency for a given amount of steam treatment decreases with an increase in the amount of particulate material disposed on the substrate.

EXAMPLES 56 –63

These examples illustrate that increasing amounts of a tuypical additive cause an increase in the bonding efficiency.

Several samples of aluminum foil were coated by a procedure similar to that described in Examples 33 –55 using various dispersions containing zero parts, 0.03 parts, and 0.2 parts of sodium hydroxide per part of titanium dioxide and coating at the various coating weights shown in Table III.

TABLE III

| Ex. No. | Coating Weight g./cm.$^2$ × 10$^4$ | Bonding efficiency - % Parts NaOH/Part of TiO$_2$ | | |
|---|---|---|---|---|
| | | 0 | 0.03 | 0.2 |
| 56 | 2 | 92 | 134 | 134 |
| 57 | 4 | 50 | 116 | 120 |
| 58 | 6 | 30 | 82 | 112 |
| 59 | 8 | 14 | 50 | 99 |
| 60 | 9 | — | 33 | — |
| 61 | 10 | 10 | | |
| 62 | 11 | | | 77 |
| 63 | 14 | | | 40 |

The data of Table III shows that at a given coating weight of particulate material, the use of increasing amounts of the additive sodium hydroxide results in increasing efficiency of the bonding process. The bonded coatings obtained are hydrophilic macroscopically smooth, tough and scratch resistant.

Other typical additives which increase the efficiency of bonding of particulate materials to aluminum substrates in a similar manner include magnesium oxide, calcium oxide, barium oxide, sodium acetate, calcium acetate, magnesium nitrate and barium nitrate.

EXAMPLES 64 –68

These examples illustrate that increasing the time of exposure of the sample to an oxidizing water-containing environment increases the efficiency of bonding of particulate material to aluminum.

Aluminum foil was coated with titanium dioxide at various coating weights by a procedure similar to that described for Examples 33 –55. Substrate samples having varying coating weights were then exposed to steam (100° C.) in an open vessel for periods of time from 1 minute to 30 minutes, washed, dried, and weighed. The bonding efficiency for each coating weight for each period of time was calculated. The data obtained is recorded in Table IV.

TABLE IV

| Ex. No. | Steam Treatment Time (Min.) | BONDING EFFICIENCY (%) Coating Weight of Particulate Material Disposed on Substrate | | | |
|---|---|---|---|---|---|
| | | $2.5 \times 10^{-4}$ g/cm$^2$ | $3.0 \times 10^{-4}$ g/cm$^2$ | $4.0 \times 15^4$ g/cm$^2$ | $8.0 \times 15^{-4}$ g/cm$^2$ |
| 64 | 1 | 8 | 7 | 5 | 4 |
| 65 | 5 | 80 | 58 | 41 | 10 |
| 66 | 10 | 90 | 72 | 48 | 20 |
| 67 | 15 | 115 | 98 | 72 | 31 |
| 68 | 30 | 137 | 123 | 88 | 34 |

When examples similar to Examples 64 –68 are repeated using in place of titanium dioxide particles, other particulate material such as silica, alumina, bismuth titanate, gramma-ferric oxide, and zinc (cadmium) sulfide, similar increases in bonding efficiency with time are obtained.

EXAMPLES 69 –87

These examples illustrate the effect of various volatile vehicles on the efficiency of bonding of particulate material to aluminum.

Dispersions of titanium dioxide were prepared by ball milling for about 17 hours a mixture of 10 grams of titanium dioxide and 200 ml. of the volatile vehicles shown in Table V. Each of the dispersions obtained were then coated at various coating weights onto 8 mil aluminum sheet that had been cleaned as disclosed in Example 1. The coatings were then dried and exposed to steam in an open vessel for 5 minutes, washed, dried and the coating weight after steaming determined. The data obtained are recorded in Table V.

TABLE V

| Ex. No. | Dispersion Vehicle | Coating Weight (g./cm.$^2$ × 10$^4$) | Bonding Efficiency (Percent) |
|---|---|---|---|
| 69 | Toluene | 0.95 | 50 |
| 70 | " | 1.5 | 30 |
| 71 | " | 4.2 | 10 |
| 72 | " | 6.9 | 7 |
| 73 | Benzene | 0.7 | 82 |
| 74 | " | 1.3 | 52 |
| 75 | " | 2.2 | 20 |
| 76 | " | 3.1 | 12 |
| 77 | " | 6.3 | 10 |
| 78 | Isopropanol | 1.5 | 125 |
| 79 | " | 1.9 | 105 |
| 80 | " | 3.1 | 58 |
| 81 | " | 4.2 | 39 |
| 82 | " | 6.8 | 18 |
| 83 | Methanol | 0.7 | 165 |
| 84 | " | 1.7 | 125 |
| 85 | " | 1.9 | 119 |
| 86 | " | 4.2 | 110 |
| 87 | " | 5.3 | 109 |

The data of Table V shows that bonding is obtained when toluene, benzene, methanol and isopropanol is used as the vehicle for dispersing the particulate material. Other chemically unreactive volatile vehicles give similar results. In addition, the data shows that bonding efficiency is increased when using liquid vehicles which cause the least amount of particulate agglomeration because tighter packing of particles on the substrate is obtained.

EXAMPLE 88

This example illustrates the use of an aluminum surface having particulate titanium dioxide bonded thereto as a photoconductive surface for use in electrophotography.

An aluminum sheet having particulate titanium dioxide bonded thereto was prepared as in Example 1.

The bonded layer is exposed through a photographic negative to UV radiation from a "Black Ray" IVL 22 source at a distance of 5 mm. for 5 seconds and then developed at +3500 volts by the electrographic process disclosed in U.S. Pat. No. 3,563,734. The dry-toner particles deposit in the unexposed areas of the surface of the bonded layer. The dry-toner powder image can be transferred to a suitable receptor by conventional electrical or mechanical means.

EXAMPLE 89

This example illustrates the use of an aluminum surface having particulate titanium dioxide bonded thereto as the substrate for use as a presensitized printing plate. An aluminum sheet having particulate titanium dioxide bonded thereto was prepared as in Example 1. The surface of the bonded layer was swabbed with a 10% aqueous solution of sodium silicate. After drying the surface was dip-coated with an aqueous solution of a conventional diazo salt. The dried sheet was then exposed through a photographic negative to ultraviolet radiation for 1 minute. After washing the undecomposed, i.e., unexposed, diazo salt from the surface with water, the surface was contacted with water and then with lithographic ink. The ink adhered only to areas containing the photodecomposed diazo salt. The ink image can then be transferred to a receptor sheet such as paper to provide printed images of high resolution and clean background.

Similar results are obtained when the plates are prepared using zinc oxide, magnesium oxide, or titanium dioxide containing 3% sodium hydroxide.

EXAMPLE 90

This example illustrates a presensitized printing plate comprising an aluminum sheet having particulate titanium dioxide bonded thereto.

The titanium dioxide is bonded to the aluminum sheet as in Example 1. The surface of the bonded particulate layer is then silicated in accordance with the procedure of U.S. Pat. No. 2,714,066 (Jewett and Case) by dipping it into a solution containing 3.75% Star Brand Silicate at 88° C. for 2.5 minutes, followed by rinsing with distilled water at 28° C. for 30 seconds and air drying. A sensitizer solution is then squeeze-roll coated on the silicated surface and dried. The sensitizer solution contains the zinc chloride double salt of the condensation product of 4-diazodiphenylamine and paraformaldehyde along with thiourea and boric acid stabilizers.

Plates sensitized as above are overcoated with a photopolymer solution comprising:

| | |
|---|---|
| "Formvar 15/95S" (tradename for a polyvinyl formal resin available from Monsanto Chemical Company) | 44 parts |
| "VMCH" vinyl resin (tradename for a vinyl acetate/vinyl chloride/maleic anhydride copolymer available from Union Carbide Company) | 15 parts |
| Trimethylol propane trimethacrylate | 33 parts |
| Trimethacrylate of trishydroxy-ethyl isocyanurate | 11 parts |
| 2,4-Bis-trichloromethyl-6-(4'-methoxy styryl)-s-triazine | 1.7 parts |
| Monastral Blue pigment | 10 parts |
| Ethylene dichloride | 585 parts |

The photopolymer solution is milled, filtered, and diluted so that it will provide coating weights of approximately 160 mg./ft.$^2$ when dip coated onto the sensitized plates.

Imagewise exposure of the coated aluminum plates through a litho negative, followed by development with a propanol-water solution gives blue oleophilic images on the hydrophilic surface of the plate. A press run shows this plate to run clean and to resist background scratching for many thousands of impressions.

EXAMPLE 91

This example illustrates the photocatalytic character of aluminum surfaces having certain particulate materials bonded thereto in accordance with the technique of the invention.

Particulate titanium dioxide was bonded to an aluminum sheet as described in Example 1. The surface of the bonded layer was swabbed with a 3% solution of palladium chloride in iso-propyl alcohol and dried. The dried sheet was then exposed through a photographic negative to ultraviolet radiation for about 45 seconds, washed with dilute hydrochloric acid and dipped into a commercial electroless copper plating bath. Copper deposited imagewise in the exposed areas, i.e., in those areas where the palladium chloride had been photocatalytically reduced under the influence of ultraviolet radiation by the titanium dioxide.

The plate obtained is useful as a lithographic printing plate. When this treated surface is contacted with water and then with a lithographic ink, the ink adheres only to the copper areas and not to the hydrophilic background areas. The ink image can then be transferred to a receptor sheet such as paper.

Similar photocatalytic plates useful for the preparation of lithographic printing plates are obtained when the titanium dioxide is replaced by cerium oxide, zinc oxide, or bismuth titanate.

What is claimed is:

1. A process for preparing a coated aluminum substrate comprising:
   a. applying particulate material to an aluminum substrate, said particulate material having an average particle size of about 0.05 to 3000 microns, a melting point above about 150° C., and a water solubility of less than about 0.1 part per 100 parts of water at 100° C., and
   b. exposing the aluminum substrate bearing the particulate material to an oxidizing environment containing water for a time, in an amount, and at a temperature sufficient to provide in situ formation of aluminum hydroxyoxide whereby the particulate material is firmly bound to the aluminum substrate.

2. A process in accordance with claim 1 wherein said particulate material is water-wettable and has a major dimension in the range of from about 0.05 to about 50 microns.

3. A process comprising:
   a. applying a mixture comprising particulate material disposed in liquid vehicle to an aluminum substrate, said particulate material having an average particle size of about 0.05 to 3000 microns, a melting point above about 150° C., and a water solubility of less than about 0.1 part per 100 parts of water at 100° C.,
   b. removing at least a substantial portion of said liquid vehicle, and
   c. exposing said aluminum substrate bearing said particulate material to an oxidizing environment containing water for a time, in an amount, and at a temperature sufficient to provide in situ formation of aluminum hydroxyoxide whereby said particulate material is firmly bound to said aluminum substrate.

4. A process in accordance with claim 3 wherein said particulate material is water-wettable.

5. A process in accordance with claim 3 wherein said particulate material is selected from the group consisting of titanium dioxide, zinc oxide, gamma-ferric oxide, barium titanate, zirconium dioxide, and cerium oxide.

6. A process in accordance with claim 3 wherein said oxidizing environment is steam.

7. The process of claim 3 wherein said mixture additionally contains an inorganic material in an amount sufficient to provide said mixture with a pH of at least 3.5, said inorganic material being capable of increasing the bonding efficiency of said particulate material to said aluminum substrate relative to said mixture in the absence of said inorganic material.

8. The process of claim 7 wherein said inorganic material is selected from the group consisting of calcium oxide, barium oxide, magnesium oxide, sodium hydroxide, sodium acetate, barium nitrate, magnesium nitrate, strontium nitrate, calcium nitrate, calcium fluoride, calcium acetate, calcium carbonate, barium carbonate, and sodium bicarbonate.

9. The process of claim 3 wherein said oxidizing environment is a gaseous atmosphere containing water vapor at a temperature of 50° C. to 150° C.

* * * * *